United States Patent
Jeong

[11] Patent Number: 6,091,600
[45] Date of Patent: Jul. 18, 2000

[54] APPARATUS FOR TILTING KEYBOARD OF PORTABLE COMPUTER

[75] Inventor: Dong Yeol Jeong, Kyungki-do, Rep. of Korea

[73] Assignee: Daewoo Telecom Ltd, Incheon, Rep. of Korea

[21] Appl. No.: 09/109,169

[22] Filed: Jun. 30, 1998

[30] Foreign Application Priority Data

Jun. 30, 1997 [KR] Rep. of Korea ...................... 97-29596

[51] Int. Cl.[7] .............................. G06F 1/16; B41J 11/56
[52] U.S. Cl. ........................................... 361/680; 400/682
[58] Field of Search ................................... 361/680, 679; 341/20, 22; 400/681, 682

[56] References Cited

U.S. PATENT DOCUMENTS

| | | | |
|---|---|---|---|
| 5,490,036 | 2/1996 | Lin et al. | 361/680 |
| 5,534,891 | 7/1996 | Takano | 361/680 |
| 5,635,928 | 6/1997 | Takagi et al. | 341/22 |
| 5,754,395 | 5/1998 | Hsu et al. | 361/680 |
| 5,764,474 | 6/1998 | Youens | 361/680 |
| 5,818,360 | 10/1998 | Chu et al. | 341/22 |

*Primary Examiner*—Lynn D. Feild
*Attorney, Agent, or Firm*—Lilling & Lilling

[57] ABSTRACT

The present invention relates to an apparatus for tilting a keyboard of portable computer, in a manner that a rear end of the keyboard is raised up to a predetermined height by opening its cover, so that the user can operate keys of the keyboard more conveniently. The apparatus for tilting the keyboard of a portable computer of the invention can radiate heat generated from various electric components on a main PCB of a base, during operating the computer, through a ventilation space formed between a keyboard cage on the top side of the base and a bottom side of the keyboard when opening the cover. The apparatus in accordance with the present invention comprises: a keyboard of which both sides of a front portion are rotatably joined by hinge means to a front portion of a keyboard cage formed on a base. A cover is rotably engaged with the base by hinge means mounted within an interior of a rear side portion of the base to be engaged with at least a protruding member of the cover. At least one sector gear is formed on the protruding member, and there is at least one slider moved forwardly and rearwardly in the rectilinear direction according to opening and closing the cover, for moving the rear end of the keyboard upwardly and downwardly.

1 Claim, 5 Drawing Sheets

APPARATUS FOR TILTING KEYBOARD OF PORTABLE COMPUTER

BACKGROUND OF THE INVENTION

1. Field of the Invention

The present invention relates to portable computers, such as laptop or notebook computers, and more particularly relates to an apparatus for tilting a keyboard of a portable computer, in a manner that a rear end of the keyboard is raised up to a predetermined height automatically according to opening its cover, so that the user can operate keys of the keyboard more conveniently.

2. Discussion of Related Art

Recently, portable computers, such as laptop or notebook computers, have become popular and are in widespread usage in many countries. The increased demand for such computers has been partially due to the compact size of these computers which make them ideal for travel or in applications where work space is limited.

In order to maximize space efficiency and facilitate portability of these laptop and notebook computers, such portable computers have typically a suitcase like construction that includes largely a base having a keyboard, and a cover including a computer screen.

Referring to FIG. 1, there is shown a conventional portable computer 10, in a exploded perspective view, comprising a base 17 having data input devices such as a keyboard 13 and touch pads 15 on a top side, and a cover 19 which is pivotally secured for upward and downward movements along a rear side of the base 17 usually by means of some form of hinge mechanism and covers the top side of the base 17 so as to protect key elements thereupon.

The base 17 further comprises a keyboard cage 21, formed in a predetermined depth on the top side, for receiving the keyboard 13, a main printed circuit board (PCB) 23 on which a computer's central processing unit (CPU) is mounted, a power supply such as a battery and various storage devices such as a floppy or hard disk are established therein, these electronic components are connected electrically to main PCB 21.

The cover 19 also further includes an LCD panel 25, mounted on an inner side thereof, for displaying information inputted from the data input means, and an LCD driving circuit for interconnecting the main PCB 23 of the base 17 and the LCD panel 25 of the cover 17 electrically by means of a conductive cable 27 therein.

Along the rear side portion of the base 17 and the rear end of the cover 19, a plurality of protruding members 29 are formed opposite to each other for pivotal assembling, including pivotal holes 33, formed longitudinally, through which pivotal pins 31 are inserted.

In the above configuration, after fitting the protruding members 29 together and positioning the pivotal holes 33 in a straight line, the pivotal pins 31 are inserted therethrough, thus joining the cover to the base 17 pivotally.

Meanwhile, when the portable computer is driving, heat is generated from the CPU and the other various electric components on the PCB 23, and this heat raises the temperature of the system and deteriorates performance of the electric components mounted within the interior of the base 17. Accordingly, in general, a cooling fan is established on the top of the CPU so as to radiate forcedly the heat generated therefrom. While it is somewhat effective to radiate the heat from the CPU at the beginning stage, it is no more effective to do so in case that the temperature of the interior of the base 17 increases throughout by the heat generated from the other electric components on the main PCB 23 as operating time passes long. Therefore, it is necessary to radiate the heat from the CPU using the cooling fan, at the same time to radiate continuously the heat from the other electric components on the main PCB 23 by a natural convection system as well.

Meanwhile, it is more convenient to operate keys 13a arranged on a keyboard 13 of portable computer 10 when the front end of the keyboard 13 is designed lower than the rear end. But in a conventional portable computer 10, usually the keyboard 13 is mounted horizontally on the top side of the base 17, considering the thickness of the computer when the cover 19 is closed onto the top side of the base 17. Accordingly, due to its fixed horizontal keyboard, it is inconvenient to operate the keys 13a on the keyboard 13 and it inflicts the stress on the user's hand and wrist.

SUMMARY OF THE INVENTION

Accordingly, it is an object of the present invention to provide an apparatus for tilting a keyboard of a portable computer, in a manner that a rear end of the keyboard is raised up to a predetermined height by opening its cover, so that the user can operate keys of the keyboard more conveniently.

It is another object of the present invention to provide an apparatus for tilting a keyboard of a portable computer, capable of radiating heat generated from various electric components on a main PCB on a base, during operation of the computer, through a ventilation space formed between a keyboard cage on the top side of the base and a bottom side of the keyboard when opening the cover.

To accomplish the objects of the invention, there is provided a portable computer in accordance with the present invention comprising: a keyboard of which both sides of a front portion are rotably joined by hinge means to a front side of a keyboard cage on a base. A cover is rotatably engaged with the base by hinge means mounted within an interior of a rear side portion of the base to be engaged with at least a protruding member of a cover at least one section is formed on the protruding member, and there is at least one slider moved forwardly and rearwardly in the rectilinear direction according to opening and closing the cover, for moving the rear end of the keyboard upwardly and downwardly.

The keyboard tilting member in accordance with the present invention includes: a guide slot formed within the interior of the rear side portion of the base, where the keyboard tilting member meets the protruding member of the cover, communicating with the keyboard cage, having a protruding opening of a predetermined depth therethrough; a sector gear formed on the circumferential side of the protruding member of the cover; and a slider mounted within the interior of the guide slot to be slidably moved forwardly and rearwardly in the rectilinear direction therein, having a slanted edge of a predetermined incline on the front end thereof and a rack gear on the top side thereof to be engaged with the sector gear on the protruding member of the cover through the protruding opening.

It is to be understood that both the foregoing general description and the following detailed description are exemplary and explanatory and are intended to provide further explanation of the invention as claimed.

BRIEF DESCRIPTION OF THE ATTACHED DRAWINGS

DETAILED DESCRIPTION OF PREFERRED EMBODIMENT

Reference will now be made in detail to the preferred embodiments of the present invention, examples of which are illustrated more detailedly in the accompanying drawings.

Figure 1:
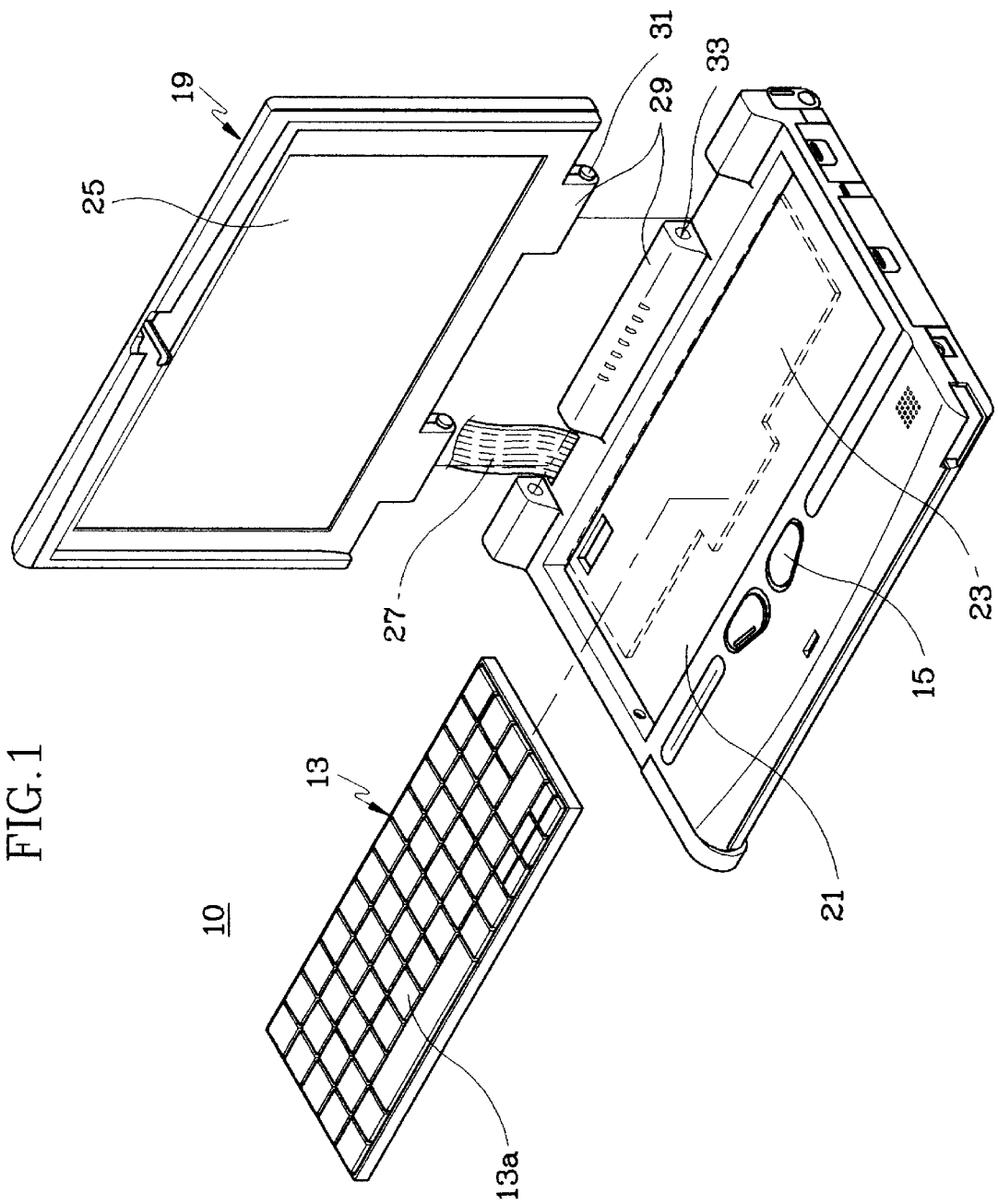
FIG. 1 is an exploded perspective view showing a conventional portable computer including a base with a keyboard and a cover.
Figure 2:
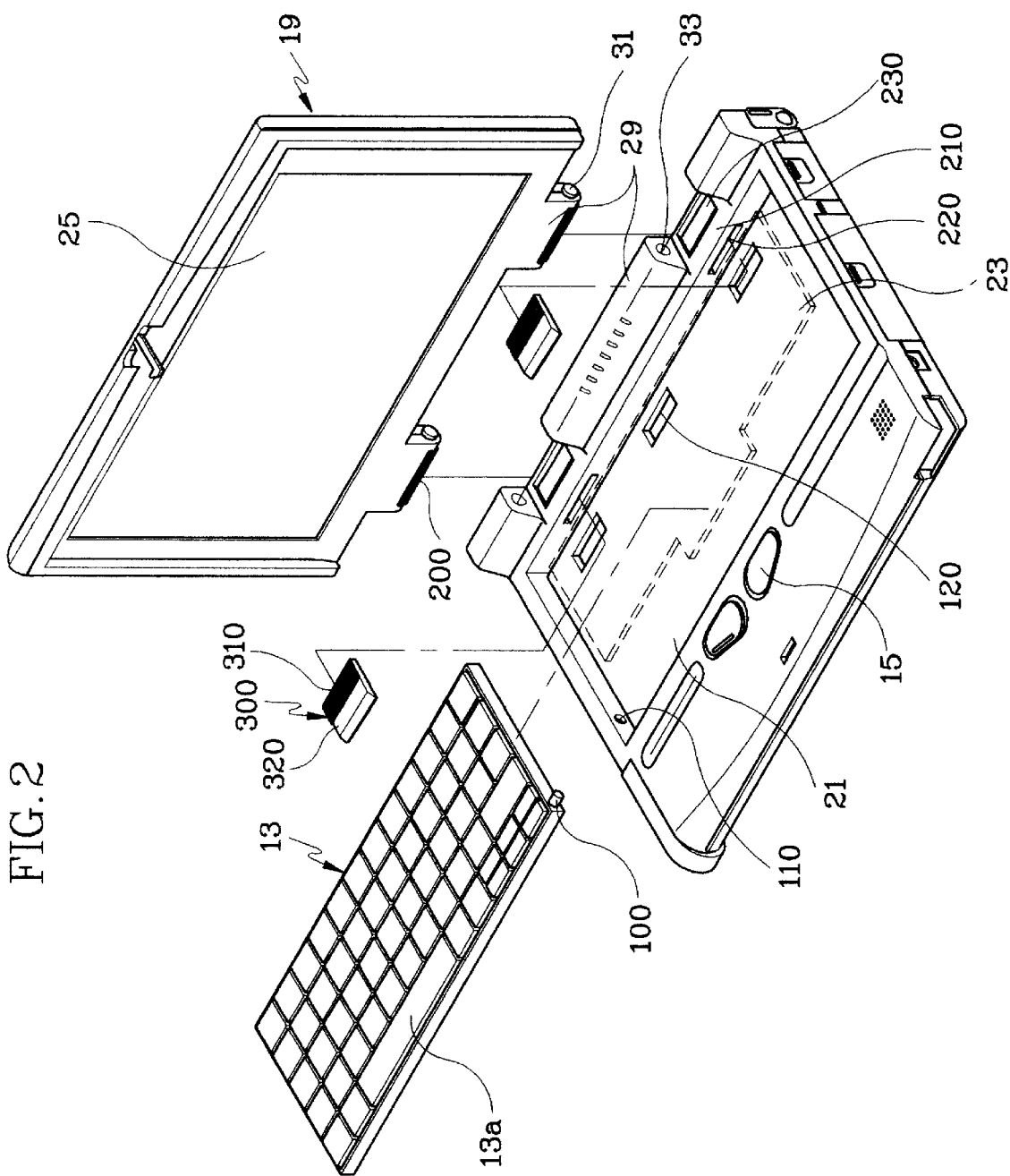
FIG. 2 is an exploded perspective view showing an apparatus for tilting a keyboard of portable computer in accordance with the present invention.
Figure 3:
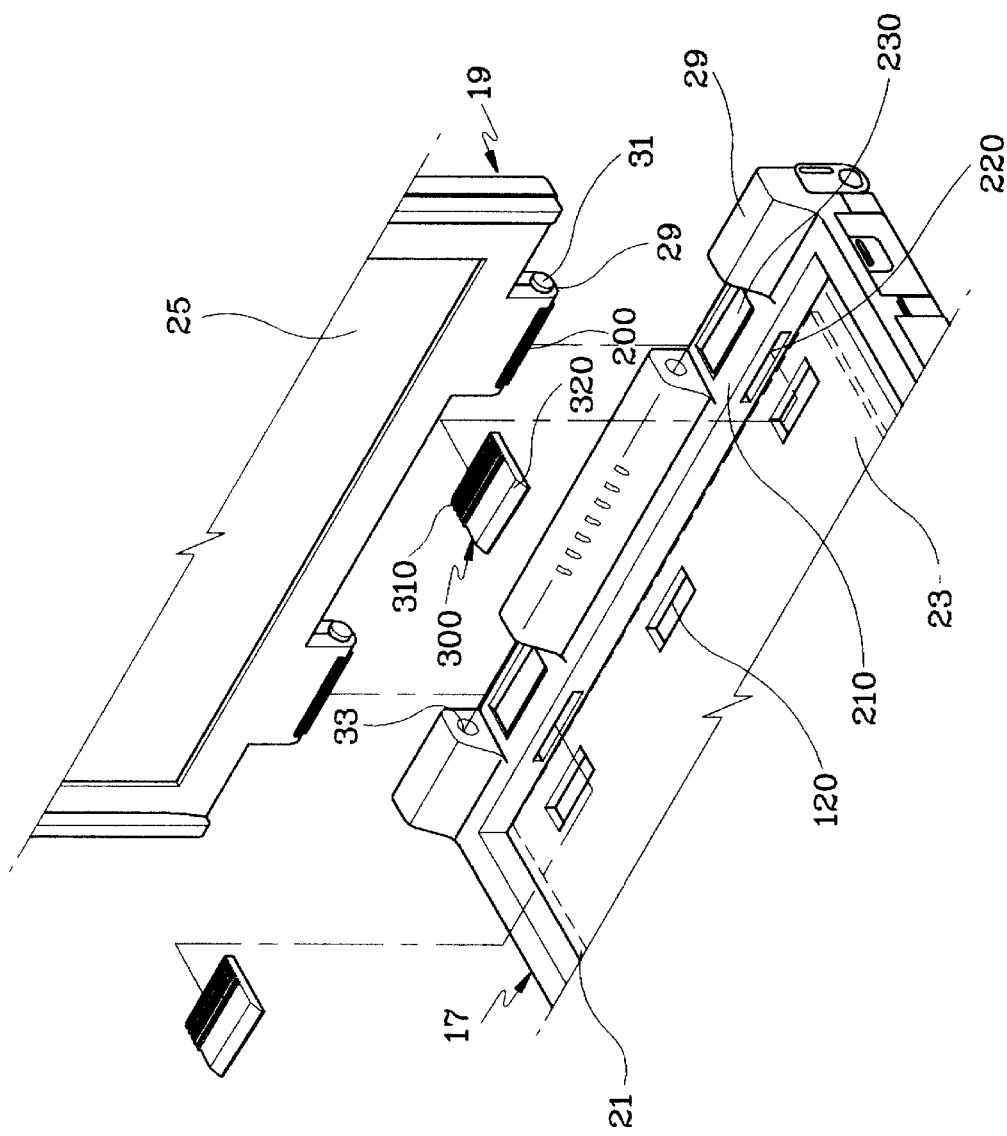
FIG. 3 is an enlarged scale, exploded perspective view showing the apparatus for tilting the keyboard of portable computer shown in FIG. 2.

Referring initially here to FIGS. 2 and 3, a portable computer 10 in accordance with the present invention includes a keyboard cage 21 on a top side of a base 17 for receiving a keyboard 13 and a main PCB 23 established on an interior of the base 17, corresponding to the downside of the keyboard cage 21. A pair of projecting pins 100 are molded on both sides of the front portion of the keyboard 13 and a pair of pin openings 110 are correspondingly formed on both sides of the front portion of the keyboard cage 21 for receiving the projecting pins 100. A plurality of ventilation holes 120 are established on the bottom side of the keyboard cage 21, for communicating with the interior of the base 17 on which the main PCB 23 is mounted, for leading a conductive cable from the keyboard 13 into the main PCB 23 and at the same time for radiating the heat generated from various electric components on the PCB 23.

The base 17 and the cover 19 are joined to each other pivotally by hinge means in a manner that a plurality of protruding members 29 in each rear side portion of the base 17 and the cover 19 oppositely are to be come in contact with each other for pivotal assembling, the protruding members 29 on the base include pivotal holes 33, established in the longitudinal direction, through which pivotal pins 31 are inserted.

The cover 19 includes an LCD panel 25, mounted on a front side thereof, for displaying information inputted from data input means such as the keyboard 13 or touch pads 15, and an LCD driving circuit for interconnecting the main PCB 23 of the base 17 and the LCD panel 25 electrically. The cover 19 further includes a sector gear 200 on the circumferential sides of each protruding member 29 formed on the rear side portion thereof in the range of predetermined angle.

The base 17 includes a plurality of guide slots 220, formed on the wall of the rear side portion 210, communicating with the keyboard cage 21, and a plurality of protruding openings 230 on the rear side portion 210 for receiving the sector gears 200 of the protruding members 29 on the cover 19, the guide slots 220 and the protruding openings 230 are communicated with each other in a predetermined depth. A plurality of sliders 300 are inserted into the guide slots 220 so as to raise the rear end of the keyboard 13 upwardly when opening the cover 19. Each sliders 300 has a rack gear 310 on the top side in a predetermined length thereof, engaging with the sector gear 200, and a slanted edge 320 slanted forwardly and downwardly with a predetermined incline along the front end thereof.

The sliders 300, a part of the keyboard tilting member, are first inserted into guide slot 220 from the keyboard cage 21, and projecting pins 100 on both sides of the front portion of the keyboard 13 are inserted into pin openings 110, correspondingly provided on both sides of the front portion of the keyboard cage 21, before mounting the keyboard 13 on the keyboard cage 21. Then, after fitting protruding members 29 of the base 17 and the cover 19 together to arrange pivotal holes 33 in a straight line, through which pivotal pins 31 are inserted, the cover 19 is pivotally joined to the base 17, and sector gears 200 on the circumferential sides of protruding members 29 of the cover 17 are engaged with rack gears 310 on sliders 300, exposed through protruding openings 230 on the rear side portion 210.

Figure 4:
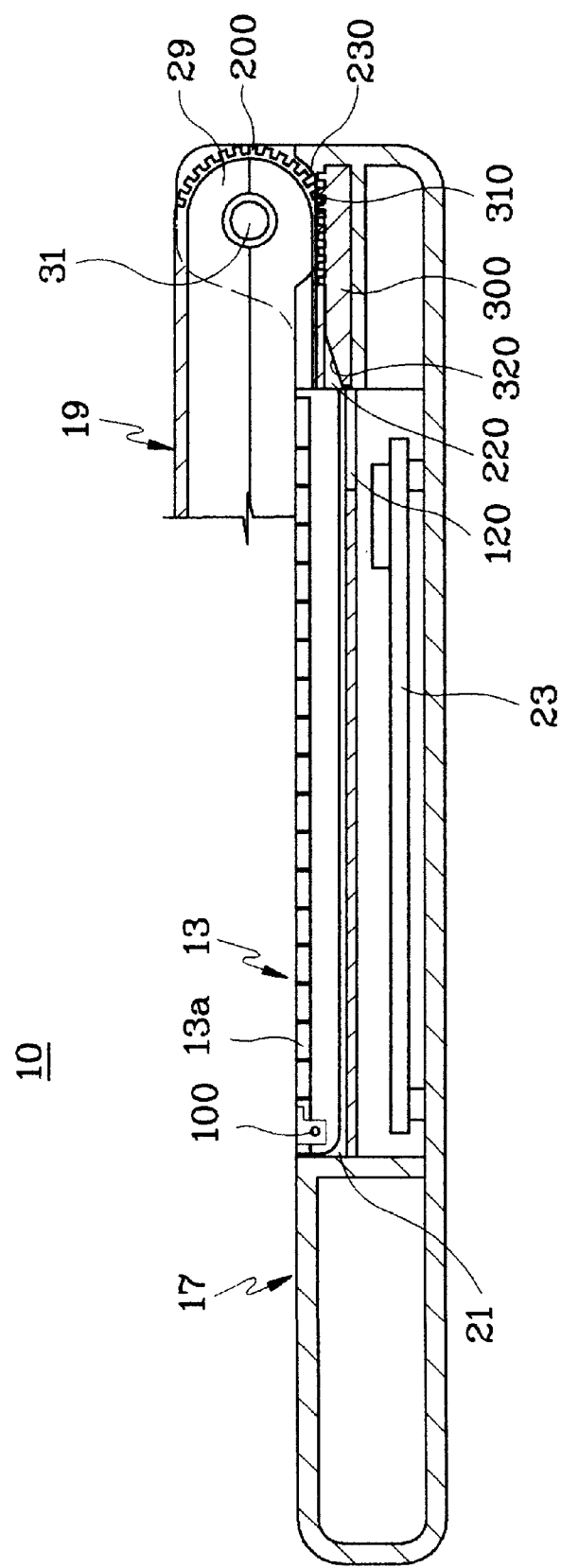
FIG. 4 is a cross-sectional view showing a closing state of the cover to the base of the portable computer in accordance with the present invention.

Referring now to FIG. 4, a cross-sectional view showing a closing state of the cover to the base of the portable computer in accordance with the present invention, sliders 300, a part of the keyboard tilting member, are being located backward within the interior of the guide slots 220 according to closing the cover 19 to the base 17. The keyboard 13 mounted in the keyboard cage 21 is parallel with the bottom side of the base 17.

Figure 5:
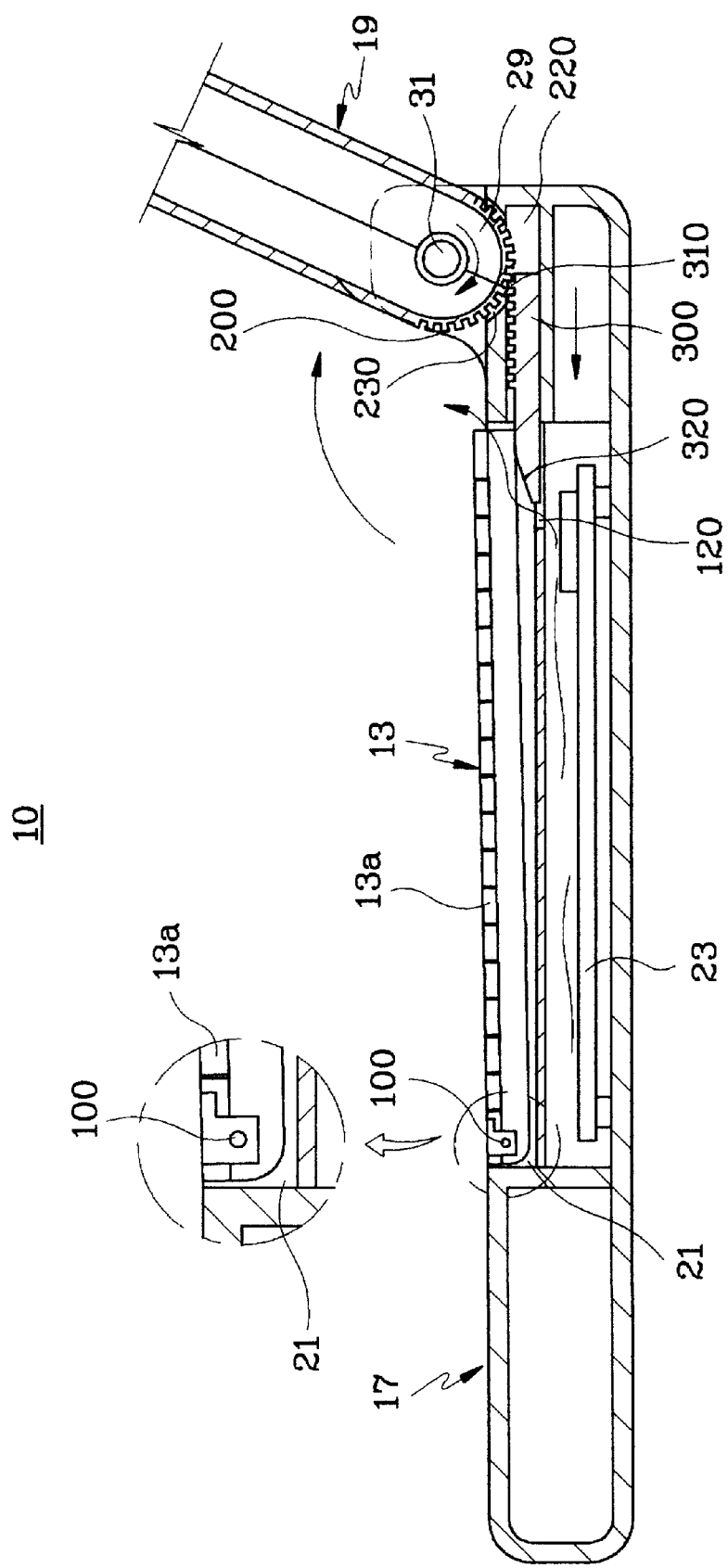
FIG. 5 is a cross-sectional view showing an operating state of the apparatus for tilting the keyboard of portable computer opened in accordance with the present invention.

Referring to FIG. 5, a cross-sectional view showing an operating state of the apparatus for tilting the keyboard of portable computer opened in accordance with the present invention, when the cover 19 is opened from the base 17, protruding members 29 of the cover are rotated clockwise pivotally, centering pivotal pins 31 of pivotal hinge portion where both sides of the front portion of the keyboard 13 are pivotally joined to corresponding both sides of the front portion of the keyboard cage 21 on the base 17, and sliders 300 are moved toward the bottom side of the keyboard 13 in the rectilinear direction by engaging of sector gears 200 with rack gears 310, thus raising the rear end of the keyboard 13 upwardly with a predetermined angle, centering the pivotal hinge portion where both sides of the front portion of the keyboard 13 are pivotally joined to corresponding both sides of the front portion of the keyboard cage 21 on the base 17.

The incline angle of the keyboard 13 is determined by the height of the slider 300 inserted into the bottom of the rear end of the keyboard 13, or by the incline of the slanted edge 320 formed on the front end of the slider 300.

Here, when opening rearwardly the cover 19 completely, the keyboard 13 is placed on the top of the front end of the sliders 300, and a ventilation space is formed between the keyboard cage 21 and the bottom side of the keyboard 13. Accordingly, the heat, generated from various electric components on the main PCB 23 during driving the system, is radiated naturally through ventilation holes 120 established on the bottom side of the keyboard cage 21 and ventilation space formed between the keyboard cage 21 and the bottom side of the keyboard 13.

Furthermore, with the keyboard 13 tilted forwardly and downwardly toward the user of the computer, it facilitates operation of keys 13a on the keyboard 13.

When the cover 19 is closed downwardly to the base 17 after use of the portable computer like that, protruding members 29 of the cover are rotated counterclockwise pivotally, centering pivotal pins 31 of hinge portion pins, and sliders 300, located under the bottom side of the keyboard 13, are moved backward rectilinearly by engagement of sector gears 200 and rack gears 310 and positioned within the interior of the guide slots 220. Here, the keyboard 13 being placed on the top of the front side of the sliders 300 is put downwardly by it own weight to return to the initial position parallel with the bottom side of the base 17 shown in FIG. 4.

As explained above, according to the present invention, the keyboard is tilted forwardly and downwardly toward the user of the computer by raising the rear end of the keyboard upwardly with a predetermined angle, centering the pivotal hinge portion of the front side of the keyboard, when closing the cover of portable computer.

In addition, the heat generated from various electric components on the main PCB during driving the system can be radiated naturally less than a datum point through ventilation holes established on the bottom side of the keyboard cage and ventilation space formed between the keyboard cage and the bottom side of the keyboard to keep the temperature of the interior of the base, thus protecting electric components that may be deteriorated by the heat.

It will be apparent to those skilled in the art that various modifications and variations can be made in the apparatus for tilting the keyboard of portable computer of the present invention without departing from the spirit or scope of the invention. Thus, it is intended that the present invention covers the modifications and variations of this invention provided they come within the scope of the appended claims and their equivalents.

What is claimed is:

1. An apparatus for tilting a keyboard of a portable computer comprising:

a base on which a keyboard cage is formed with hinge means provided at a front portion of said keyboard cage, said keyboard being rotably joined by said hinge means to said keyboard cage, and at least one guide slot being defined at a rear portion of said base and at least one protruding opening being defined at said rear portion of said base;

a cover rotably engaged with said base by hinge means, and said cover including protruding members at said rear portions of said base and said cover, and at least one sector gear being formed on a circumferential surface of said protruding member of said cover; and, at least one slider mounted at said rear portion of said base and being slidably moved forwardly and rearwardly in a rectilinear direction within said base, said slider including a rack gear on a top side thereof and engagable with said sector gear on a corresponding protruding member of the cover, and a slanted edge of said slider having a predetermined incline on a front side thereof and to be in contact with a rear bottom portion of said keyboard, wherein said slider moves forwardly and rearwardly through at least one guide slot at said rear portion of said base and said sector gear of said cover and said rack gear of said slider are engaged with each other within said protruding opening at said rear portion of said base; and wherein, said apparatus maintains the keyboard in a tilted position at a desired angle or horizontally by moving the slider forwardly and rearwardly according to the rotary motion of the sector gear of said cover.

* * * * *